United States Patent [19]

Idage et al.

[11] Patent Number: 5,714,567
[45] Date of Patent: Feb. 3, 1998

[54] PROCESS FOR THE PREPARATION OF AROMATIC POLYESTERS

[75] Inventors: Bhaskar Bhairavnath Idage; Sudhakar Sadashiv Mahajan; Swaminathan Sivaram, all of Pune, India

[73] Assignee: Council of Scientific & Ind. Research, New Delhi, India

[21] Appl. No.: 602,023

[22] Filed: Feb. 15, 1996

[51] Int. Cl.⁶ .................................................. C08G 63/00
[52] U.S. Cl. .......................... 528/180; 528/176; 528/179; 528/180; 528/185; 528/491; 528/492; 528/503; 524/284; 524/356
[58] Field of Search ..................................... 528/176, 179, 528/180, 185, 491, 492, 503; 524/284, 356

[56] References Cited

U.S. PATENT DOCUMENTS

| | | | |
|---|---|---|---|
| 3,684,766 | 8/1972 | Jackson, Jr. et al. | 525/437 |
| 4,314,051 | 2/1982 | Berger et al. | 528/179 |
| 4,330,668 | 5/1982 | Hideo et al. | 528/271 |
| 4,374,239 | 2/1983 | Berger et al. | 528/176 |
| 4,386,183 | 5/1983 | Wempe | 524/405 |
| 4,485,230 | 11/1984 | Yu | 528/125 |
| 5,164,478 | 11/1992 | Lee et al. | 528/481 |
| 5,340,908 | 8/1994 | Idage et al. | 528/275 |

*Primary Examiner*—Samuel A. Acquah
*Attorney, Agent, or Firm*—Michael D. Bednarek; Kilpatrick Stockton LLP

[57] ABSTRACT

An improved process for the preparation of aromatic polyesters, whereby dialkyl esters of aromatic dicarboxylic acids are melt-polymerized with aromatic bisphenol to furnish an amorphous poly(arylester) prepolymer. The amorphous poly(arylester) prepolymer is crystallized, separated, and dried to provide a crystallized poly(arylester) prepolymer, which is heated to yield the aromatic polyester.

8 Claims, No Drawings ary polyesters. The present invention
PROCESS FOR THE PREPARATION OF AROMATIC POLYESTERS This invention relates to an improved process for the preparation of aromatic polyesters. The present invention relates to an improved process for the preparation of aromatic polyester is based on dialkyl esters of aromatic dicarboxylic acids and dihydric phenols. The invention more particularly relates to an improved process for the preparation of high molecular weight (Mn 12,000-15,000) aromatic polyester.

Aromatic polyesters are a class of polymers generally made from bisphenol(s) and aromatic diacid(s) particularly mixtures of terephthalic acid and isophthalic acid. These polyesters are high performance transparent thermoplastics with a good combination of thermal and mechanical properties. They are processed by injection molding, extrusion and film forming technique for its conversion to different types of useful products.

Amorphous polyesters are generally prepared by melt polymerization. One such melt polymerization is the diacetate process. In the diacetate process, a dihydric phenol is converted to its diester derivative which is then reacted with an aromatic dicarboxylic acid to yield aromatic polyester.

In this context references may be made to the following literature: U.S. Pat. Nos. 4,374,239; 4,386,186; 4,330,668; 4,485,230.

Aromatic polyesters by diacetate process have a tendency to be coloured which makes them unsuitable for many applications. Another problem associated with production of aromatic polyesters by diacetate process is the formation of carboxylic acid as a by-product, which is corrosive and requires special material for reactor construction.

German offen DE 3,824,069 describes a variation of the diacetate process. In this process aromatic polyester is produced by reacting dialkyl esters of aromatic dicarboxylic acids with bisphenol-A diacetate in presence of a catalyst. Methyl acetate comes out as a by-product, however, it cannot be recycled in the process.

U.S. Pat. No. 5,340,908 describes a process for the preparation of aromatic polyester by melt polymerization using alcoholysis route. This process comprises of two steps, the first step comprises of preparation of polyester prepolymer having intrinsic viscosity in the range of 0.10 to 0.30 dL/g by reacting dimethyl esters of terephthalic acid and isophthalic acid with bisphenol-A in the melt phase in presence of solvent and catalyst. The second step consists of melt polymerization of purified polyarylate prepolymer in the presence of a catalyst.

The drawback of the melt polymerization processes is that melt viscosities increase dramatically with increase in molecular weight, causing problems in agitation and heat transfer and consequent impact on product quality and process economics.

Solid state polycondensation is a commonly practised technique to obtain high molecular weight crystalline polymers such as poly(ethylene terephthalate), nylon-6,6 etc. In this technique polycondensation is generally carried out by heating semicrystalline prepolymer in a stream of inert gas or under vacuum at a temperature just below the polymer melting temperature. The salient features of solid state polycondensation are (1) The prepolymer is handled in powdered (or chips) form, thus the solid state polycondensation process requires a very simple reactor design, (2) The reaction temperatures employed are very much lower than that in melt polycondensation, hence a clean reaction is observed devoid of side reactions or thermal degradation, (3) Very high molecular weight polycondensates can be prepared, which are inaccessible through a melt process.

The prior literature reports few variations of the diacetate process for the preparation of aromatic polyester by a solid state polycondensation of prepolymer.

U.S. Pat. No. 3,684,766 discloses a process for copolyester by reacting bisphenol-A diacetate with terephthalic acid and isophthalic acid. The resulting prepolymer was contacted with a crystallization medium. The crystallized prepolymer was heated in a fluidized bed, at a temperature below the melting point for certain period to achieve a copolyester having inherent viscosity of 0.50 or more.

U.S. Pat. No. 4,314,051 describes a process for preparing crystalline prepolymer by reacting at least one diester derivative of a dihydric phenol with at least one aromatic dicarboxylic acid and then heating the prepolymer below its melting point to form a crystalline polyester having a reduced viscosity of 0.45 to 1.20 dL/g.

U.S. Pat. No. 4,994,546 describes a process for the preparation of aromatic polyester from a prepolymer prepared by reacting bisphenol-A, acetic anhydride and at least one aromatic dicarboxylic acid. The prepolymer polycondensed under agitation to form a powdery solid which is further polymerized until the desired molecular weight is achieved.

U.S. Pat. No. 5,164,478 discloses a process for the preparation of aromatic polyester having low colour wherein bisphenol-A, acetic anhydride, terephthalic acid and isophthalic acid are melt polymerized to form a prepolymer. The prepolymer is then treated with a crystallization medium and then further polymerized in the solid state by heating the prepolymer below its melting point under an inert gas flow.

The prior art solid state polycondensation processes use prepolymers prepared by acidolysis of bisphenol-A diacetate by terephthalic acid and isophthalic acid. These prepolymers contain acetate and carboxylic end groups which react further under solid state polycondesation conditions yielding high molecular weight polyester with the formation of acetic acid as a by-product. The disadvantage of the above process is that it is not easy to remove acetic acid. Furthermore, acetic acid handling requires equipments with special materials of construction. Furthermore presence of traces of acetic acid in the product may affect the thermal stability of the polyester.

Another object of the present invention is to provide an improved process for the preparation of aromatic polyesters employing poly(arylester) prepolymer containing dialkyl and ester groups.

Accordingly, the present invention provides an improved process for the preparation of aromatic polyesters by the use of poly(arylester) prepolymer which contains hydroxyl and ester and groups employing solid state poly condensation yielding high molecular weight (Mn=12,000-15,000) aromatic polyester.

In the present process methyl alcohol is formed as a by product. Since methyl alcohol is a low boiling compound it can be removed conveniently and efficiently from the reactor. The recovered methyl alcohol can be effectively used.

Poly(arylester) Prepolymers containing hydroxyl and ester groups have not been used in the prior art for preparation of aromatic polyester by solid state polycondensation technique.

The main objective of the present invention is therefore to provide an improved process for the preparation of high molecular weight aromatic polyester overcoming the drawbacks of hitherto known processes.

Accordingly, the present invention provides an improved process for the preparation of aromatic polyesters which comprises (i) melt polymerizing dialkyl esters of aromatic dicarboxylic acids with aromatic bisphenol in presence of a catalyst to form an amorphous poly(arylester) prepolymer containing hydroxyl and ester groups. (ii) Crystallizing the poly(arylester) prepolymer by suspending diluent and heating at reflux temperature for a period in the range of 2–4 hrs, (iii) separating and drying the crystallized poly(arylester) prepolymer, and (iv) heating the crystallized poly(arylester) prepolymer in such a way that the polymer remain solid by conventional methods.

During the heating stage, the poly(arylester) prepolymer undergoes further polymerization in the solid state with an increase in molecular weight.

The process of the present invention thus obviates the drawbacks of the prior art processes for the preparation poly(arylester) from dialkyl esters of aromatic dicarboxylic acids and aromatic bisphenols.

In one of the embodiments of the present invention the prepolymer suitable for the process is generally amorphous and has an intrinsic viscosity of approximately 0.20–0.30 dL/g corresponding to number average molecular weight in the range of 2,800–6,000.

In another embodiment of the invention, the poly(arylester) prepolymer can be prepared by melt polycondensation process as described in U.S. Pat. No. 5,340,908 by reacting esters of aromatic dicarboxylic acids with aromatic bisphenol(s) in presence of a catalyst.

These poly(arylester) prepolymers do not show any crystalline peak either in Differential Scanning Calorimetry (DSC) or X-ray diffraction (XRD) and hence termed amorphous.

In another embodiment of the present invention the dialkyl esters employable may be dimethyl terephthalate, dimethyl isophthalate and mixtures thereof, as well as 2,6-naphthalene dicarboxylic acid esters and alkyl substituted homologs of such dicarboxylic acid esters wherein the alkyl group contain 1 to 4 carbon atoms.

In yet another embodiment the bisphenol employable may be bisphenol-A, halo substituted bisphenol-A, alkyl-substituted bisphenol-A, hydroquinone, and resorcinol and various types of other polyphenols.

In yet another embodiment the catalyst employed may include alkoxides of Gr IVB metals and derivatives of Gr IVA metals.

The diluents used can be chosen from organic compounds such as ethyl acetate, acetone, toluene or xylene or combinations thereof or the like. The diluent may be any solvent that will promote crystallization but not dissolve the poly(arylester) prepolymer. The heterogeneous mixture of poly(arylester)-prepolymer and the diluent is then heated to the respective refluxing temperatures. The optimum temperature and time for crystallization will depend upon the nature of the diluent. Subsequently the diluent is removed by distillation and the product is dried in vacuum at 70°–80° C. for 3–4 hours. The dried poly(arylester) prepolymers show appreciable crystallinity as observed by the appearance of crystalline melting peaks in DSC in the range of 190° to 250° C. The catalyst employed may be dibutyltin diesters, tin phenoxide, silicon phenoxide etc. The amount of catalyst employed may be in the range of 0.05 to 0.50 weight percent based on prepolymer.

The crystallized poly(arylester) prepolymer may be post-polymerized in solid state at different pressures ranging from atmospheric pressure to sub-atmospheric pressure. Generally 1 atm (760 mm, Hg) is maintained during the initial phase and subsequently the pressure is reduced to 1.0 to 0.1 mm, Hg or even lower. The temperature of the reaction may be the range of 170°–240° C. The heating time may be between 8–15 hours, depending on the molecular weight range desired.

Alternatively the crystallized poly(arylester) prepolymer can be heated in a fluidized bed at a temperature below the melting point of the polymer using a hot inert gas for a period of time which is sufficient to achieve an intrinsic viscosity of 0.60 dL/g. The inert gas can be chosen amongst nitrogen, argon, carbon dioxide or helium.

The process of the present invention is described herein below by examples which are illustrative only and should not be construed to limit the scope of the present invention, in any manner.

EXAMPLE 1

A prepolymer (1 g, having intrinsic velocity [n]=0.20 dL/g in chloroform at 30° C.) was taken in 100 mL round bottomed flask along with 25 mL ethyl acetate and $5 \times 10^{-4}$ g of dibutyltin dilaurate and refluxed at 80°–90° C. for 4 hours. Thereafter the ethyl acetate was removed by distillation and the poly(arylester) prepolymer dried in vacuum (1 mm, Hg) at 70°–80° C. The poly(arylester) prepolymer was mechanically crushed and particles passing through 22 mesh screen was collected. 0.75 g of this poly(arylester) prepolymer was heated to 170° C. under nitrogen over a period of 1 hour. Thereafter the pressure was reduced to 1 mm, Hg and the prepolymer was held at 170° C. for 5 hours at the first instance and 2 hours each at 200° C., 220° C. and 240° C. respectively. Subsequently the poly(arylester) was cooled to room temperature. The resulting poly(arylester) had intrinsic viscosity [n] of 0.35 dL/g at 30° C. in chloroform.

EXAMPLE 2

A poly(arylester) prepolymer (1 g, having intrinsic velocity [n]=0.20 dL/g in chloroform at 30° C.) was taken in 100 mL round bottomed flask along with 25 mL ethyl acetate and $5 \times 10^{-4}$ g of dibutyltin dilaurate and refluxed at 80°–90° C. for 4 hours. Thereafter the ethyl acetate was removed by distillation and the poly(arylester) prepolymer dried in vacuum (1 mm, Hg) at 70°–80° C. The poly(arylester) prepolymer was mechanically crushed and particles passing through 22 mesh screen was collected. 0.75 g of poly(arylester) prepolymer was heated to 170° C. under nitrogen over a period of 1 hour. Thereafter the pressure was reduced to 1 mm, Hg and the prepolymer was held at 170° C. for 6 hours at the first instance and 2 hours each at 200° C., 220° C. and 240° C. Subsequently the poly(arylester) was cooled to room temperature. The resulting poly(arylester) had intrinsic viscosity [n] of 0.54 dL/g at 30° C. in chloroform.

EXAMPLE 3

A poly(arylester) prepolymer (1 g having intrinsic velocity, [n]=0.20 dL/g in chloroform at 30° C.) was taken in 100 mL round bottomed flask along with 25 mL acetone and $5 \times 10^{-4}$ g of dibutyltin dilaurate and refluxed at 60°–70° C. for 4 hours. Thereafter the acetone was removed by distillation and the poly(arylester) prepolymer dried in vacuum (1 mm, Hg) at 70°–80° C. The poly(arylester) prepolymer was mechanically crushed and particles passing through 22 mesh screen was collected. 0.75 g of poly(arylester) prepolymer was heated to 170° C. under nitrogen over a period of 1 hour. Thereafter the pressure was reduced to 1 mm, Hg and the poly(arylester) prepolymer was held at 170° C. for 5 hours at the first instance and 2 hours each at 180° C., 200° C., 220° C. and 240° C. Subsequently the poly(arylester) was cooled to room temperature. The resulting poly(arylester) had intrinsic viscosity [n] of 0.50 dL/g at 30° C. in chloroform.

EXAMPLE 4

A poly(arylester) prepolymer (1 g, having intrinsic velocity [n]=0.30 dL/g in chloroform at 30° C.) was taken in 100 mL round bottomed flask along with 25 mL toluene and $5 \times 10^{-4}$ g of dibutyltin dilaurate and refluxed at 110°–120° C. for 4 hours. Thereafter the toluene was removed by distillation and the poly(arylester) prepolymer dried in vacuum (1 mm, Hg) at 70°–80° C. The poly(arylester) prepolymer was mechanically crushed and particles passing through 22 mesh screen was collected. 0.75 g of poly(arylester) prepolymer was heated to 200° C. under nitrogen over a period of 1 hour. Thereafter the pressure was reduced to 1 mm, Hg and the poly(arylester) prepolymer was held at 200° C. for 5 hours at the first instance and 2 hours each at 220° C., 240° C. and 250° C. Subsequently the poly(arylester) was cooled to room temperature. The resulting poly(arylester) had intrinsic viscosity [n] of 0.60 dL/g at 30° C. in chloroform.

EXAMPLE 5

A poly(arylester) prepolymer (1 g, having intrinsic velocity [n]=0.30 dL/g in chloroform 30° C.) was taken in 100 mL round bottomed flask along with 25 mL xylene and $5 \times 10^{-4}$ g of dibutyltin dilaurate and refluxed at 140°–150° C. for 4 hours. Thereafter the toluene was removed by distillation and the poly(arylester) prepolymer dried in vacuum (1 mm, Hg) at 70°–80° C. The poly(arylester) prepolymer was mechanically crushed and particles passing through 22 mesh screen was collected. 0.75 g of poly(arylester) prepolymer was heated to 200° C. under nitrogen over a period of 1 hour. Thereafter the pressure was reduced to 1 mm, Hg and the poly(arylester) prepolymer held at 200° C. for 5 hours at the first instance and 2 hours each at 220° C., 240° C. and 250° C. Subsequently the poly(arylester) was cooled to room temperature. The resulting poly(arylester) had intrinsic viscosity [n] of 0.55 dL/g at 30° C. in chloroform.

The main advantages of the invention are

The present process uses the poly(arylester) prepolymer prepared by alcoholysis of aromatic bisphenol(s) by dialkyl esters of aromatic dicarboxylic acid(s). Unlike the poly (arylester) prepolymer prepared by acidolysis of bisphenol (s) diacetate by aromatic dicarboxylic acid(s), the poly (arylester) prepolymer prepared by alcoholysis route is free from residual by-product as the by-product (methyl alcohol) being the low boiling compound is removed efficiently and conveniently. Hence allows the production of better quality prepolymer. High molecular weight polyesters can be produced by solid state polycondensation of these poly (arylester) prepolymers without any need of operations such as premelting, efficient agitation etc. Aromatic polyester melts have high viscosities and hence cannot be agitated easily to provide uniform heating and local over heating cause the melt to degrade. On the contrary, solid state polymerization does not require agitation hence there is no danger of polymer degradation and consequently poly (arylester) with good colour is obtained. Poly(arylester)s of any desired molecular weights can be produced for end applications such as injection molding or extrusion simply by controlling the time temperature profile.

We claim:

1. An improved process for the preparation of aromatic polyesters which comprises:

(i) melt polymerizing dialkyl esters of aromatic dicarboxylic acids with aromatic bisphenol in presence of a catalyst to form an amorphous poly(arylester) prepolymer containing hydroxyl and ester groups;

(ii) crystallizing the amorphous poly(arylester) prepolymer by suspending it in a diluent and heating at reflux temperature for a period in the range of 2–4 hrs;

(iii) separating and drying the crystallized poly(arylester) prepolymer, and (iv) heating the crystallized poly(arylester) prepolymer while the polymer remains solid by conventional methods.

2. The improved process as claimed in claim 1, wherein the catalyst used in step (i) is selected from the group consisting of metals of group IV B, metal alkoxides, and group IV A metals.

3. The improved process as claimed in claim 1, wherein the diluent is selected from the group consisting of ethyl acetate, acetone, toluene, xylene, and mixture thereof.

4. The improved process as claimed in claim 1, wherein the crystallized poly(arylester) prepolymer is dried under vacuum at a temperature in the range of 70°–80° C.

5. The improved process as claimed in claim 1 wherein the amount of catalyst used ranges from 0.05 to 0.50 weight percent of prepolymer.

6. The improved process as claimed in claim 1, wherein the crystallized poly(arylester) prepolymer is heated to a temperature in the approximate range of 200°–250° C. under 1 mm, Hg pressure.

7. The improved process as claimed in claim 1, wherein the crystallized poly(arylester) prepolymer is heated in a fluidised bed at a temperature below the melting point of the polymer in the presence of an inert gas.

8. The improved process as claimed in claim 7 wherein the inert gas used is selected from the group consisting of nitrogen, argon, $CO_2$ and helium.

\* \* \* \* \*